United States Patent [19]

Moore et al.

[11] 4,406,707

[45] Sep. 27, 1983

[54] METHOD FOR REMOVING VINYL DECALS

[75] Inventors: Ronnie J. Moore, 2767 Whitehurst Dr., Marietta, Ga. 30062; Michael D. Brown, Smyrna, Ga.

[73] Assignee: Ronnie J. Moore, Marietta, Ga.

[21] Appl. No.: 318,632

[22] Filed: Nov. 5, 1981

Related U.S. Application Data

[62] Division of Ser. No. 218,473, Dec. 22, 1980, Pat. No. 4,336,072.

[51] Int. Cl.³ .............................................. B08B 3/08
[52] U.S. Cl. .......................................... 134/4; 134/38; 252/167
[58] Field of Search ...................... 134/4, 38; 252/139, 252/167, 168, 169, 170, 364, DIG. 8

[56] References Cited

U.S. PATENT DOCUMENTS

| | | | |
|---|---|---|---|
| 2,168,024 | 8/1939 | Ensminger | 252/168 |
| 2,552,520 | 5/1951 | Coler | 252/170 |
| 2,672,450 | 3/1954 | Pearsall | 252/170 |
| 2,753,939 | 7/1956 | Carpenter et al. | 252/170 X |
| 3,099,584 | 7/1963 | Walsh | 134/38 X |
| 3,429,823 | 2/1969 | Cataneo | 134/38 X |
| 3,538,007 | 11/1970 | Cooper et al. | 252/169 X |
| 3,920,472 | 11/1975 | Vinson | 134/38 X |
| 3,998,654 | 12/1976 | Falaas et al. | 134/4 |
| 4,120,810 | 10/1978 | Palmer | 252/169 X |
| 4,274,884 | 6/1981 | Cartwright | 134/38 X |
| 4,306,989 | 12/1981 | Motsenbocker | 252/170 X |

*Primary Examiner*—Marc L. Caroff
*Attorney, Agent, or Firm*—Jones & Askew

[57] ABSTRACT

Vinyl decals are removed from a painted surface by contacting the decal with a composition consisting essentially of ethylene glycol monobutyl ether and one or more of the following aromatic solvents: toluene, xylene and aromatic naphtha. The composition may optionally contain ethylene glycol monoethyl ether or a thickener. The composition remains in contact with the decal for a time sufficient to loosen the decal from the surface and then the decal is physically pulled from the surface.

4 Claims, No Drawings

METHOD FOR REMOVING VINYL DECALS

This application is a division, of application Ser. No. 218,473, filed 12-22-80, now U.S. Pat. No. 4,336,072.

TECHNICAL FIELD

The present invention relates to an improved system for removing vinyl decals from surfaces to which the decals are adhered. More particularly, the present invention relates to a system for removing vinyl decals from baked enamel surfaces or uncoated metal surfaces as would be found on trucks and automobiles.

BACKGROUND OF THE INVENTION

The great majority of the commercial vehicles, aircraft and the like include decals on their body surfaces. These decals are used to spell out a company's name, or display a slogan, picture, logo or the like while also making the vehicles more visible at night.

Vinyl decals are constructed from polyvinyl materials and are secured to the vehicle surface with an adhesive specifically designed to keep the decal in place for a long period of time and through exposure to a wide variety of temperature, weather conditions, washings and commonly encountered solvents.

When a vehicle is transferred from one company to another or when the owner merely wishes to change the decals on his vehicle, some method must be used to remove the old decals. However, due to the nature of the decals and the adhesives used to adhere them to a surface, the decals are very difficult to remove by conventional means. This is particularly true of decals that have been attached for long periods of time.

A method of removing these decals using a chemical composition which could be applied to loosen these decals from a surface has long been sought. A method which is effective for removing reflective decals is disclosed in U.S. Pat. No. 4,220,549 (incorporated herein by reference). That method uses chemicals, such as methylene chloride, which require special handling so that the chemicals do not contact the skin. Such special handling is not always possible or desirable.

U.S. Pat. No. 3,920,472 (incorporated herein by reference) discloses a method for removing decals. However, the method disclosed therein has not been commercially successful. U.S. Pat. Nos. 3,950,185; 3,661,641 and 3,625,763 (all incorporated herein by reference) disclose methods for removing various coatings but are not directed to the problem of removing vinyl decals. Those patents also disclose formulations which contain chemicals which might adversely affect painted surfaces to which decals are typically applied. Furthermore, some prior methods for removing decals do not work satisfactory at low temperatures.

U.S. patent application Ser. No. 131,888, now abandoned, filed Mar. 20, 1980 (incorporated herein by reference) discloses a method for removing vinyl decals. The present invention is an improvement to the invention disclosed in said application.

BRIEF DESCRIPTION OF THE INVENTION

The present invention relates to methods and chemical compositions for removing vinyl decals from surfaces. A chemical composition useful in the present invention comprises a mixture of one or more of the following aromatic solvents: toluene, xylene and aromatic naphtha; and a mixture of glycol ethers. This chemical composition is useful for removing vinyl decals at moderate to relatively high temperatures. A chemical composition which is useful for removing vinyl decals at moderate and relatively low temperatures comprises methyl ethyl ketone and an aromatic solvent. A vinyl decal is removed from a surface by contacting the decal with the chemical compositions described above for a period of time sufficient to loosen the decal from the surface. The loosened decal is then physically removed from the surface.

Accordingly, it is an object of the present invention to provide an improved system for removing vinyl decals from surfaces.

Another object of the present invention is to provide a system for removing vinyl decals which does not damage painted surfaces to which the decal is adhered.

A further object of the present invention is to provide a system for removing a vinyl decal from a surface which also removes the adhesive used to affix the decal to the surface.

Yet another object of the present invention is to provide a system for removing a vinyl decal from a surface at relatively low temperatures.

These and other objects, features and advantages of the present invention will become apparent from a review of the following detailed description of the disclosed embodiment and the appended claims.

DETAILED DESCRIPTION OF THE DISCLOSED EMBODIMENT

The chemical composition of the present invention which is useful for removing vinyl decals at moderate temperatures comprises a mixture of one or more of the following aromatic solvents: toluene, xylene and aromatic naphtha. The amount of aromatic solvent which is useful in the moderate temperature composition is between approximately 62% and 85% by weight. Although the aromatic solvent can be comprised of only one of the above-identified solvents, it is preferred that a mixture of all three be used. Generally, it is found that a ratio of toluene to xylene to aromatic naphtha of approximately 1:1:2 provides the best results. In terms of weight percent, it is preferred that the moderate temperature composition include approximately 18.5% toluene, 18.5% xylene and 37% aromatic naphtha.

The moderate temperature composition of the present invention also includes a mixture of one or more of the following glycol ethers: ethylene glycol monobutyl ether and ethylene glycol monoethyl ether. Generally, it is found that the amount of ethylene glycol monobutyl ether useful in the moderal temperature composition is between approximately 7% and 30% by weight; preferably 16%. The amount of ethylene glycol monoethyl ether useful in the moderate temperature composition is up to approximately 9% by weight, preferably 3%.

The chemical composition of the present invention which is useful for removing vinyl decals at relatively low temperatures comprises methyl ethyl ketone and an aromatic solvent. The amount of methyl ethyl ketone which is useful in the low temperature composition is between approximately 35% and 75% by weight; preferably 45%. The aromatic solvents useful in the present invention are toluene, xylene and aromatic naphtha. Although the aromatic solvent can be comprised of one or a mixture of two or more of the above-identified aromatic solvents, the preferred aromatic solvent is toluene. The amount of aromatic solvent which is useful in the low temperature composition is between approximately 25% and 65% by weight; preferably 49%.

Both the moderate temperature composition and the low temperature composition of the present invention also optionally include between approximately 4% and 8% by weight of a thickener; preferably 6%. Thickeners which are useful in the present invention include fumed silica, methyl cellulose, ethyl cellulose and other related cellulose-type thickeners, clay-type thickeners, such as organo modified montmorillonite clay (tetraalkyl ammonium smectite) and other types of commercial gellants. Fumed silica, however, is preferred due to its properties after drying. Fumed silica is a colloidal form of silica made by combustion of silicon tetrachloride in hydrogenoxygen furnaces. The thickener is used in the present invention to increase the viscosity of the chemical composition so that the chemical composition will not readily run off verticle surfaces.

The chemical compositions can be conveniently prepared by combining all the liquid components, such as the aromatic solvents and the glycol ethers or the methyl ethyl ketone into a container. The fumed silica, which is usually a fine powder, is then added with agitation until a uniform mixture is obtained.

The method of removing a vinyl decal from a surface using the above described chemical compositions will now be considered. The first step is to prepare the decal to be removed. Although this step is optional, it is highly recommended. Since the presence of water or foreign matter, such as soot or dirt, on the surface of the decal tends to make the decal unreceptive to the compositions, it is desirable to clean and dry the decal before applying the chemical compositions thereto. A clean dry decal will therefore allow the compositions to achieve their maximum efficiency.

The second step is to apply the chemical composition to the decal. The chemical compositions can be applied to the decal in any convenient manner, however, it is preferred to apply the compositions by rolling them onto the decal using a conventional paint roller. Alternately, for small applications, the compositions can be applied by brushing with a conventional paint brush. If brushing is used, it is preferred to use brush strokes in one direction only. This method of application permits the compositions to be flowed onto the decal and prevents premature drying of the compositions. In certain applications, the compositions can be sprayed onto the decal using a sprayer, such as the bleeder or nonbleeder type, an aerosol spray can or the like.

The third step is to permit the chemical composition to remain in contact with the decal for a time sufficient to loosen the decal from the surface. The length of time varies depending upon the ambient temperature and the temperature of the decal and the surface to which it is affixed. At cooler temperatures, the moderate temperature composition must be left in contact with the decal for a longer period of time; at higher temperatures, a shorter period of time is required. For temperatures between approximately 50° and 80° F., the average time required for contact with the decal with the moderate temperature composition is between approximately fifteen minutes and two hours. In extreme cases, the time can be between approximately fifteen minutes and twenty-four hours. In the case of the low temperature composition, it is desirable to leave the composition in contact with the decal generally no longer than one-half hour. Although the low temperature composition is also useful at moderate temperatures, it is generally found that at temperatures above approximately 55° F. the composition will remove paint from the substrate as well as the decal if the substrate is painted. Of course, if the substrate is not painted or if paint removal is not a consideration, the low temperature composition is also useful at moderate temperatures, such as approximately 55° to 80° F. Although there is no specific upper limit to the temperature at which the chemical compositions are useful; when the temperature is so high that the compositions evaporate before they have been in contact with the decal for a time sufficient to loosen the decal from the surface, the compositions are no longer useful for their intended purpose. Conversely, when the temperature is so low that the compositions evaporate or freeze before they have been in contact with the decal for a time sufficient to loosen the decal from the surface, the compositions are no longer useful for their intended purpose. Generally, it is preferred that the moderate temperature composition be used at temperatures between approximately 50° and 80° F. and the low temperature composition be used at temperatures between approximately 0° and 55° F.

Determination of whether the decal has been loosened from the surface to which it is affixed can be made by lifting one corner or edge of the decal. If none of the adhesive which originally adhered the decal to the surface is left on the surface, the decal is ready to be removed. If adhesive remains on the surface, more time is required before the decal should be removed.

The final step is removal of the decal from the surface. After the chemical compositions have remained in contact with the decal for a period of time sufficient to loosen the decal, the decal can be physically removed by grasping or otherwise taking hold of the decal and peeling it from the surface. It is preferred in peeling the decal that the decal be pulled away from the surface in a direction opposite from the direction in which removal is proceeding. In other words, if the left edge of the decal is removed first from the surface and the right edge is removed last, the left edges of the decal should be pulled away from the surface toward the left as it is being removed. This method of removal best permits the decal adhesive to be pulled from the surface with the decal. Alternately, a stream of high pressure water or steam or a conventional scraper as disclosed in U.S. Pat. No. 4,220,549 can be used to remove the decal and the adhesive. At low temperatures, such as below approximately 50° F., some of the adhesive may be left on the surface after the decal is removed. In that case, the low temperature composition can be reapplied to the remaining adhesive for a time sufficient to loosen it from the surface and the remaining adhesive then removed from the surface.

If the chemical compositions are left in contact with the decal for too long, for example more than thirty-six hours for the moderate temperature composition or two hours for the low temperature composition, the compositions will usually evaporate and the decal will no longer be removable by the present method at that time. To remove the decal after this has occurred, the chemical composition is again applied to the decal in the same manner as described above. This will then permit removal of the decal in the usual manner.

The following examples are given by way of illustration of the present invention. All temperatures are given in degrees Farenheight and all percentages are by weight unless specifically stated otherwise.

EXAMPLE 1

A chemical composition of the following proportions is prepared:

| | |
|---|---|
| toluene | 18.5% |
| xylene | 18.5% |
| aromatic naphtha | 37.0% |
| ethylene glycol monobutyl ether | 16.0% |
| ethylene glycol monoethyl ether | 3.0% |
| fumed silica | 6.0% |

A truck bearing five year old vinyl decals is brought into an enclosed garage and the temperature is allowed to stabilize to the ambient temperature of 65° F. The decal is cleaned and the chemical composition is applied thereto. The chemical composition is permitted to remain in contact with the decal for one hour. The decal is then physically pulled from the surface leaving the painted surface undamaged and no residual decal adhesive remains on the surface.

EXAMPLE 2

A chemical composition of the following proportions is prepared:

| | |
|---|---|
| methyl ethyl ketone | 45% |
| toluene | 49% |
| fumed silica | 6% |

A truck bearing five year old vinyl decals is brought into an enclosed garage and the temperature is allowed to stabilize to the ambient temperature of 30° F. The decal is cleaned and the chemical composition is applied thereto. The chemical composition is permitted to remain in contact with the decal for twenty minutes. The decal is then physically pulled from the surface leaving a small amount of residual adhesive on the surface. The chemical composition is then reapplied to the residual adhesive and permitted to remain in contact therewith for approximately ten minutes. The residual adhesive is then wiped from the surface with a rag leaving the underlying painted surface undamaged.

To another section of the same truck the chemical composition of Example 1 is applied to a vinyl decal. The chemical composition is permitted to remain in contact with the decal for approximately six hours. Attempts are made to remove the decal at fifteen minute intervals from the time of application. The decal cannot be satisfactorily removed from the surface.

EXAMPLE 3

The same procedure as described in Example 1 is carried out on a variety of different vinyl decals. Vinyl decals manufactured by Minnesota Mining and Manufacturing Company were tested as follows:
  (a) Controlac Series 150, 160, 170 and 180;
  (b) Scotchcal 3650 and 3690; Vinyl decals manufactured by Morgan Adhesive Company were tested as follows:
  (c) Mecal 4302, 6990, 6950, 6910, and 7200. Other vinyl decals were tested as follows:
  (d) Fasson 900 manufactured by the Avery Label Company;
  (e) Drymark manufactured by the Meyercord Company; and
  (f) Tuff-ax manufactured by Rohm & Haas.

All of the above-described vinyl decals are satisfactorily removed.

EXAMPLE 4

A chemical composition of the following proportions is prepared:

| | |
|---|---|
| toluene | 85% |
| ethylene glycol monobutyl ether | 11% |
| fumed silica | 4% |

The chemical composition is applied as in Example 1 and the decal is satisfactorily removed.

EXAMPLE 5

A chemical composition of the following proportions is prepared:

| | |
|---|---|
| xylene | 62% |
| ethylene glycol monobutyl ether | 21% |
| ethylene glycol monoethyl ether | 9% |
| fumed silica | 8% |

The chemical composition is applied as in Example 1 and the decal is satisfactorily removed.

EXAMPLE 6

A chemical composition of the following proportions is prepared:

| | |
|---|---|
| aromatic naphtha | 64% |
| ethylene glycol monobutyl ether | 30% |
| fumed silica | 6% |

The chemical composition is applied as in Example 1 and the decal is satisfactorily removed.

EXAMPLE 7

A chemical composition of the following proportions is prepared:

| | |
|---|---|
| methyl ethyl ketone | 60% |
| xylene | 34% |
| fumed silica | 6% |

The chemical composition is applied as in Example 2 and the decal is satisfactorily removed.

It should be understood, of course, that the foregoing relates only to preferred embodiments of the present invention and that numerous modifications or alterations may be made therein without departing from the spirit and scope of the invention as set forth in the appended claims.

We claim:

1. A method for removing a vinyl decal from a painted surface without substantially damaging said painted surface, said method comprising the steps of:
    contacting said decal for a time sufficient to loosen said decal from said surface with a chemical composition consisting essentially of between approximately 62% and 85% by weight of an aromatic solvent selected from the group consisting of toluene, xylene, aromatic naphtha and combinations thereof; between approximately 7% and 30% by weight ethylene glycol monobutyl ether; and between approximately 0% and 9% by weight ethylene glycol monoethyl ether; and physically removing said loosened decal from said painted surface.

2. The method of claim 1, wherein said chemical composition further consists essentially of between approximately 4% and 8% by weight of a thickener selected from the group consistng of fumed silica, methyl cellulose, ethyl cellulose, and tetraalkyl ammonium smectite.

3. The method of claim 2, wherein said chemical composition by weight consists essentially of:

| | |
|---|---|
| toluene | 18.5% |
| xylene | 18.5% |
| aromatic naphtha | 37.0% |
| ethylene glycol monobutyl ether | 16.0% |
| ethylene glycol monoethyl ether | 3.0% |
| fumed silica | 6.0% |

4. The method of claim 1 wherein said vinyl decal is removed from said painted surface at temperatures between approximately 50° and 80° F.

* * * * *